United States Patent [19]

Meserve et al.

[11] 3,820,580

[45] June 28, 1974

[54] SIPING DRUM AND APPARATUS FOR FORMING SIPING SLASHES

[75] Inventors: Forrest Clayton Meserve, North Andover, Mass.; Ralph Christian Raabe, Jr., Letts, Iowa

[73] Assignee: Bandag Incorporated, Muscatine, Iowa

[22] Filed: July 14, 1972

[21] Appl. No.: 271,657

[52] U.S. Cl.................. 157/13, 83/340, 83/672
[51] Int. Cl............................. B29h 21/08
[58] Field of Search......... 157/13; 83/12, 340, 672

[56] References Cited
UNITED STATES PATENTS

| | | | |
|---|---|---|---|
| 2,540,058 | 1/1951 | Stern | 83/340 |
| 3,039,520 | 6/1962 | Meserve | 157/13 |
| 3,550,246 | 12/1970 | Zoller | 83/340 |
| 3,662,934 | 5/1972 | Takasi et al. | 83/672 |

Primary Examiner—Granville Y. Custer, Jr.
Assistant Examiner—Harold P. Smith, Jr.
Attorney, Agent, or Firm—Kenway & Jenney

[57] ABSTRACT

A drum is provided having at least two helical parallel threads and at least two knives attached thereto having cutting edges extending above the surface. Each knive is located on a different helical thread from the other knive. The drum is used to sipe predetermined lengths of tread stock or a tire.

10 Claims, 7 Drawing Figures

SIPING DRUM AND APPARATUS FOR FORMING SIPING SLASHES

This invention relates to an apparatus for forming siping slashes either on a sheet material of indefinite length or on a rubber tire.

Presently, siping apparatus are arranged to form siping cuts or slashes of a fixed, predetermined spacing by conforming tire tread stock of indefinite length to the contour of a helical thead and then rotating the helical thread which has a knife in a path corresponding to the pitch of one of the threads. When the helical thread is rotated, the tread stock is caused to move across the thread and the knife produces equally spaced slits therein at a distance corresponding to the pitch of the thread. Presently, automobile tires are siped to have seven cuts per inch while truck tires are siped to have 3½ cuts per inch. This has necessitated the use of 2 different siping drums each of which has a helical thread of a different pitch corresponding to the number of cuts per inch desired in the tire. This is undesirable because of the cost involved and because, in the case of the helical thread used for car tires, the lateral speed of the tire on the drum is one-half that of the tire speed employed for the drum for truck tires for a given drum rotational velocity.

It would be desirable to provide a means for siping both truck and automobile tires as well as predetermined or indefinite lengths of tire tread stock made from rubber or a synthetic polymer used in their production where only one cylindrical drum having a helical thread thereon could be used. In addition, it would be highly desirable to provide such a drum which incorporates the advantage of lateral velocity obtained with the present helical thread used for truck tires.

The present invention provides a siping drum having a surface formed of at least two helical threads and having means for positioning at least two knives therein. Each knife is positioned so that a portion of the blade extends above the drum surface and is located on one helical thread. The drum can be assembled by joining two matching drum sections each having the helical threads cut to form butt ends which fit with the butt ends of helical threads on the opposing drum section thereby forming at least two continuous parallel helical threads when the sections are joined. When the butt ends on each drum section are spaced apart a distance so that a knife blade can be positioned therebetween, no additional means need be provided to attain the desired knife position. When the butt ends on each drum are so close as to prevent positioning a knife therebetween, a circular spacing thread, the width of one thread and the same circumference as the drum is positioned between the two drum sections with one knife positioned on each side of the spacing thread and each on a different thread.

This invention will be more fully described with reference to the accompanying drawings.

Figure 1:
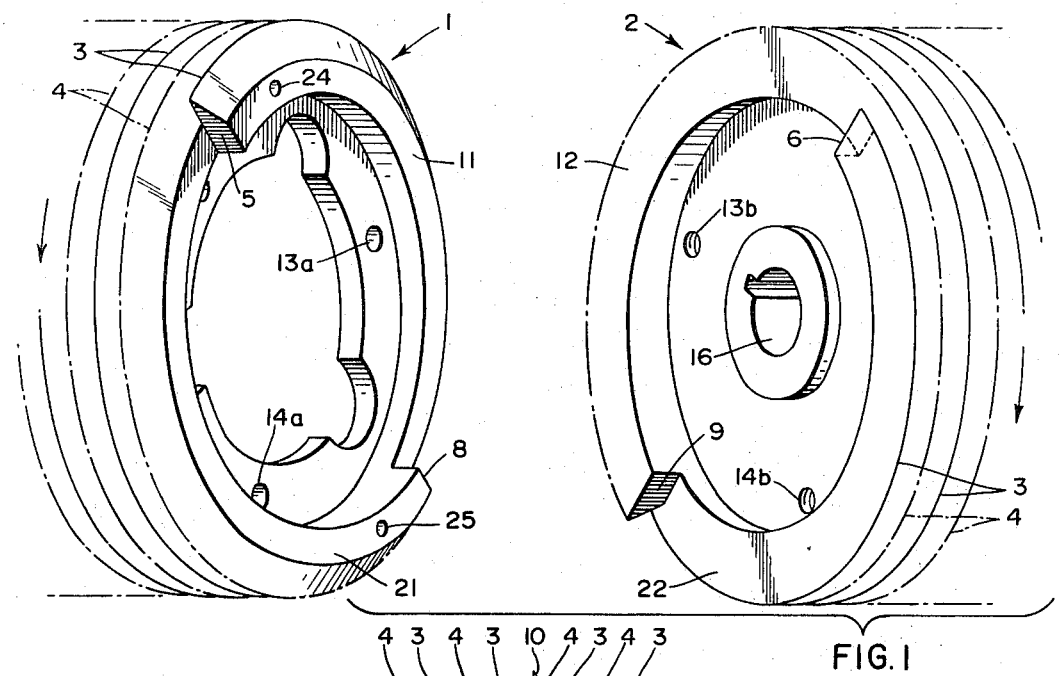
FIG. 1 is an isometric view of two complementary drum sections in spaced apart position.
Figure 2:
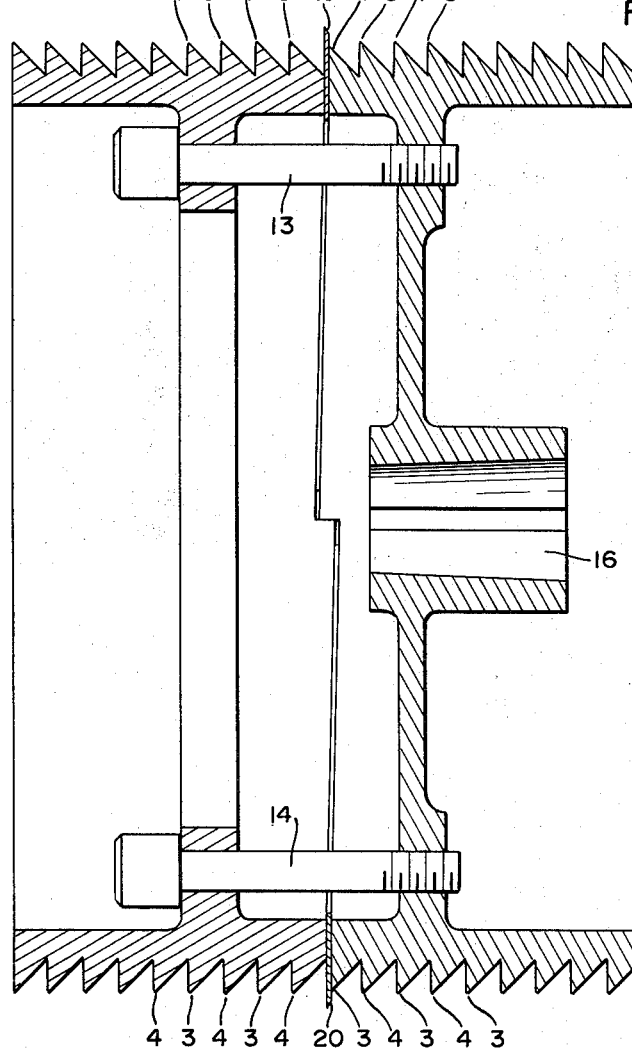
FIG. 2 is a vertical cross-sectional view of the drum of this invention when the drum sections of FIG. 1 are joined and the knives are properly positioned.

Referring to the figures, each drum section generally indicated by 1 and 2 has a generally cylindrical surface formed by two parallel helical threads 3, represented by the solid line, and 4, represented by the discontinuous line. When the two drum sections 1 and 2 are joined, the butt end 5 of helical thread 3 fits with and complements butt end 6 of helical thread 3 on drum section 2 and butt end 8 of helical thread 4 fits with butt end 9 of helical thread 4. The knife blade 10 fits between surfaces 11 and 12 and during a rotation in a counterclockwise direction bears against surface 12 when contacted with a material to be siped. The drum sections 1 and 2 are joined by bolts including bolts 13 and 14 which extend between the complementary holes provided 13a, 13b, 14a and 14b. Drum section 2 is provided with a slotted bore 16 through which extends a rotatable shaft (not shown). Knife blade 20 is placed between surface 21 and surface 22 during rotation of the drum, bears against surface 22. The knife blades 10 and 20 are relatively thin so as to maintain continuity of the helical threads and have a generally semicircular shape corresponding to the shape of the drum. The knife 10 is attached to drum section 1 as for example by a pin that fits into the bore 24 while blade 20 is attached to drum section 1 by a pin that fits into bore 25. The other end of the knives 10 and 20 remain free. Suitable knives that can be employed are disclosed in U.S. Pat. No. 3,618,654.

Figure 3:
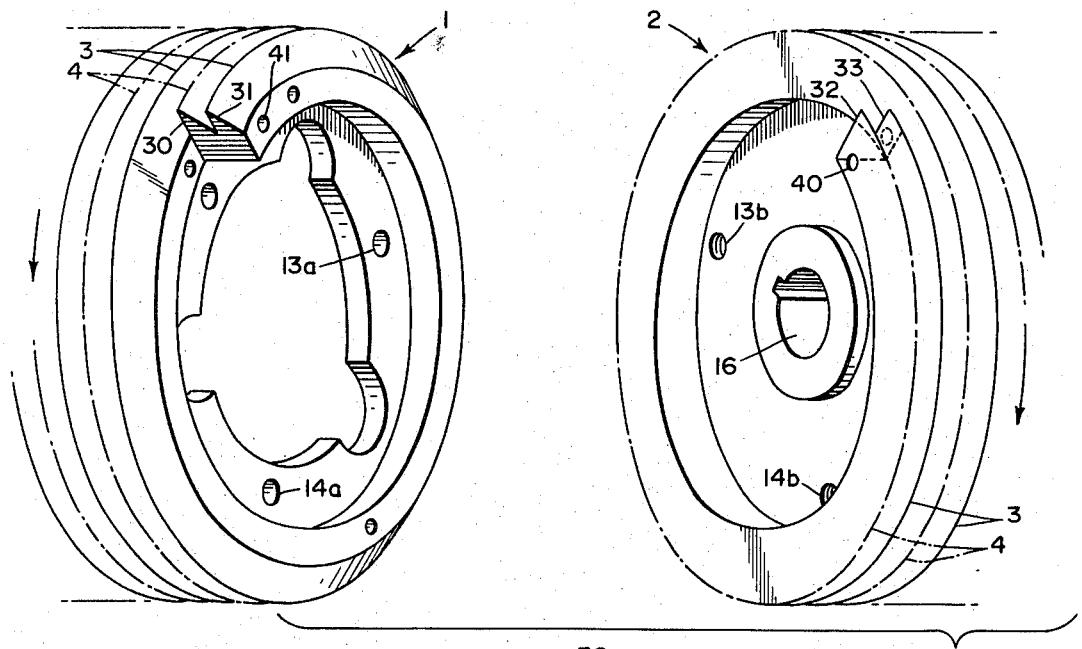
FIG. 3 is an isometric view of two complementary drum sections having the helical threads cut at the same periphery position.
Figure 5:
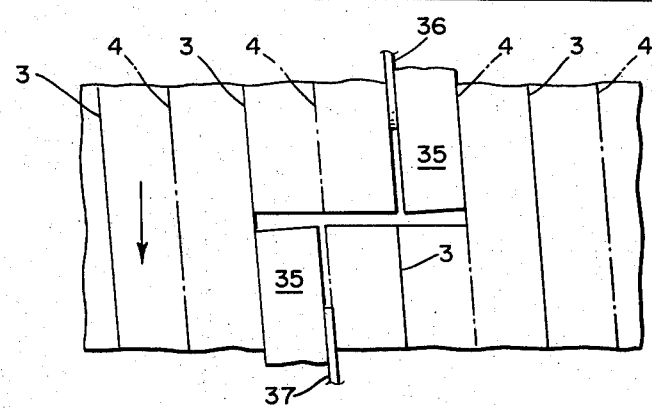
FIG. 5 is a top view of a portion of the drum surface formed by joining the drum sections of FIG. 3, the spacer, FIG. 4, and two knives.
Figure 4:
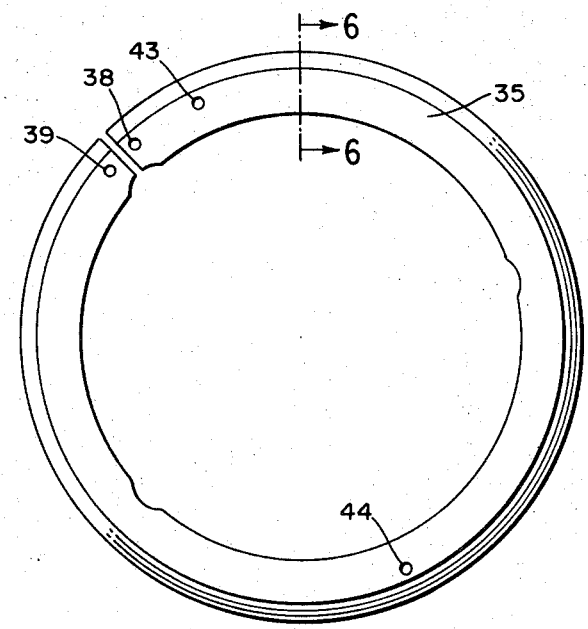
FIG. 4 is a side view of a spacer thread employed with the drum sections of FIG. 3.
Figure 6:
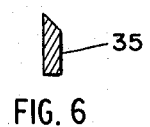
FIG. 6 is a cross-sectional view of the spacer thread of FIG. 4 taken along line 6—6.

An alternative embodiment of this invention is shown in FIGS. 3, 4 and 5. Two drum sections 1 and 2 have two substantially parallel helical threads 3 and 4. The butt end 30 of helical thread 4 and the butt end 31 of helical thread 3 are located at the same periphery position so that no knife blade can be positioned therebetween. Similarly, the butt end 32 of helical thread 4 on drum section 2 and the butt end 33 of helical thread 3 of drum section 2 are located at the same peripheral position so that no knife blade can be positioned therebetween. In this embodiment, a spacer thread 35 must be provided in order to position the two knife blades 36 and 37 each on a different helical thread 3 or 4. The spacer 35 is provided with a bore hole 39 so that it can be attached to drum section 2 at bore 40 and is provided with a bore 38 so that it can be attached to drum section 1 at bore hole 41. In addition, the spacer 35 is provided with bores 43 and 44 for attachment of knife blades 36 and 37 thereto in the manner described above. The drum section 1 and 2 then are attached with the spacer 35 and knife blades 36 and 37 therebetween in the manner described above.

Figure 7:
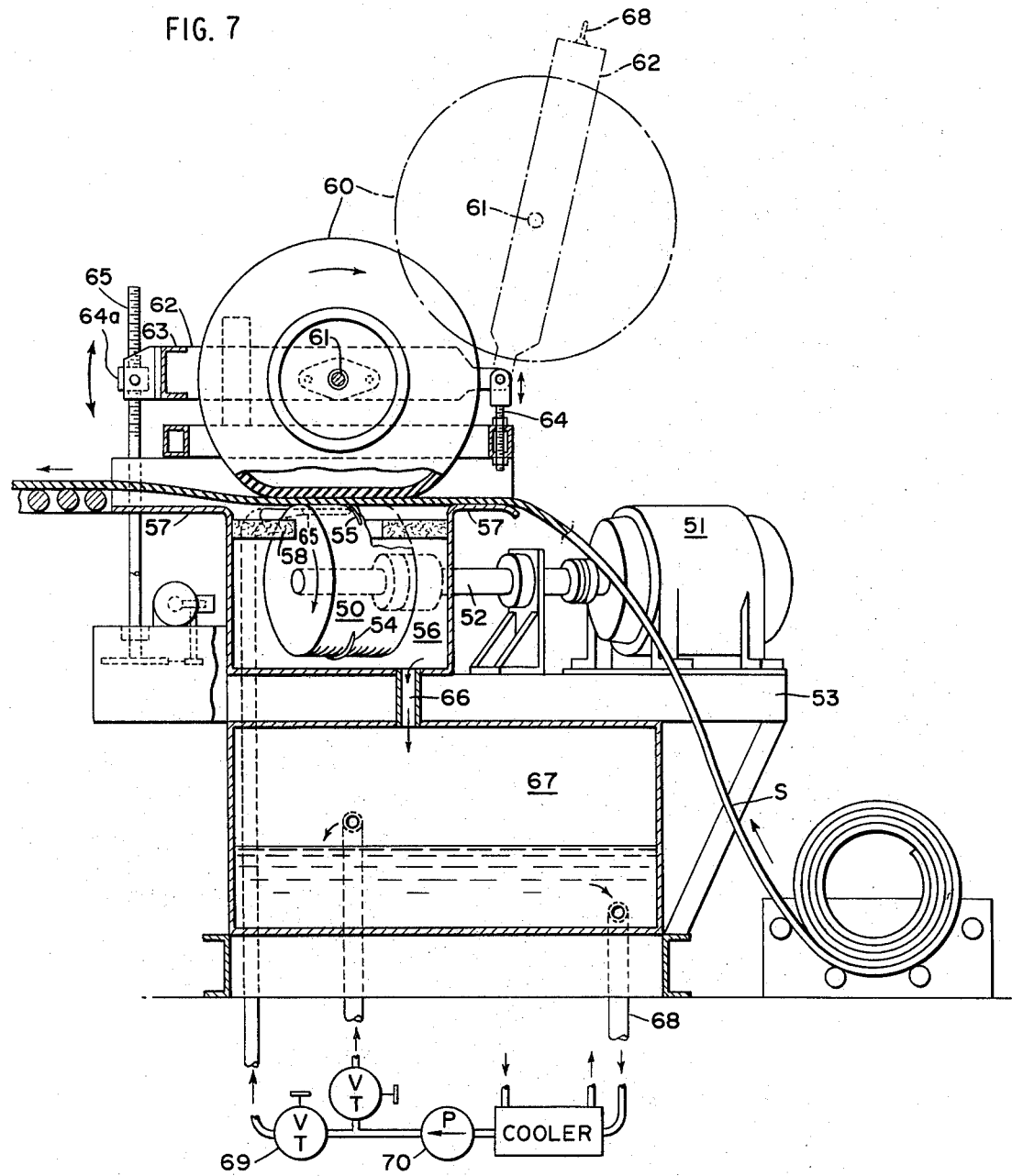
FIG. 7 is a siping apparatus employing the drum of this invention.

A suitable apparatus employing the drum of this invention is shown in FIG. 7. A table 53 beneath a portion of which is mounted the threaded drum 50, directly connected to motor 51 through a horizontal shaft 52 is mounted on table 53. The drum 50 carries the helical blade 54 and 55 which forms two siping cuts for each drum revolution. An overhead tank or reservoir 56 is mounted in one side of the frame in order that the tire stock S, preferably in chilled condition, may be conveniently fed to the machine. The tire stock is directed upwardly over an apron 57 which forms the upper edge of the overhead tank. This tank 56 is partially closed by a rectangular cover partition 58 having a rectangular aperture shaped to receive the upper sector of the threaded drum 50. This aperture is shaped to fit the drum, resting at both ends thereon and forming with the surface of the drum and the ends thereof, a standing pool of liquid lubricant.

The motor 51 with its direct-connected drum 50 constitute a unitary assembly that may be adjustably set in the frame at any desired angle to the line of feed in order to determine the traction angle of the siped cuts.

In siping tire stock for trucks only one knife need be employed and the stock can be handled at the rate of 45 feet per minute with spacing of three cuts to an inch, while for passenger tires two knives are employed to have a spacing of seven cuts to the inch at the same speed when employing a conventional 1,700 rpm motor.

A presser roll 60 cooperates with the threaded drum 50 in feeding the work and also in conforming the tire stock S to the contour of the drum. The pressure roll 60 is rotatably mounted upon a shaft 61 extending transversely between the arms 62 which are pivotally connected to the frame at their rear ends by adjustable bolts 54. These bolts are useful in adjusting the arms 62 and the pressure of the roll 60.

The arms 62 are connected at their outer ends by a transverse strut 63 and form with it a rectangular frame hinged at its inner end to the main frame of the machine.

Each of the arms 62 has at its outer end a swivel nut 64A threaded upon a long vertical screw 65 which projects upwardly from the frame and contains a motor and chain drive both geared to upright screws 65. It will be apparent that this motor may be employed to raise or lower the presser roll 60. The transverse strut of the pivoted frame is provided centrally with an eye 68 by which the pivoted secondary frame may be engaged and swung upwardly to bring the presser roll into an elevated inoperative position.

The wall of the overhead tank 56 confines a standing pool of lubricant formed by the cover partition 58 and the sector of the threaded drum 50 which projects through its apertures. The knives 54 and 55 pass upwardly in arriving at the siping point which is at the bit of the drum 50 and the presser roll 60. The result is that the knives are copiously lubricated at the point of heat generation. The depth of siping cuts may be varied by radial outward adjustment of the knives 54 and 55 about its inner end. This is herein shown as perforated to receive a stud fixed in one of the drum sections. The transverse width of the siping cuts may be increased by increasing the pressure of the presser roll 60 upon the work piece beneath it. Supplementing the lubricating step as above described, a delivery nozzle 65 is directed toward the bit of the drum and roll.

The apron 57 may be utilized as an automatic stop for stopping the machine in case it tends to run out of raw stock.

The shaft 52 makes a taper fit with the hub of the drum 50 thus providing for interchangeable employment of drums in the machine of different thread pitch or contour.

The tank 56 has a circulating passage 66 in its bottom wall and this is arranged to discharge directly into a large reservoir 67 enclosed in the main frame of the machine. The reservoir 67 is also provided near its bottom with an outlet pipe 68 which is part of a fluid circulating system including valves 69 and 70 by which the rate of flow may be regulated through by-pass connections subject to the continuous action of a collar disposed in the lower part of the reservoir 67.

The operation of the illustrative machine is carried out as follows: One end of the stip of tire stock S is first inserted by hand in the bite of the drum 50 and roll 60. At this point the knife 54 is fully immersed in the pool of lubricant as is also an upper sector of the drum 50. When the machine is started the strip of tire stock is advanced by worm and thread action of the drum 50 while lubricant is picked up by the drum and knife. The knives 54 and 55 each make one siping cut for each revolution of the drum 50.

Suitable apparatus for siping a tire which can be employed in conjunction with the siping drum of this invention is disclosed in U.S. Pat. No. 2,863,507. Thus, the roll 60 of FIG. 7 can be replaced on the shaft 61 with a tire to be siped while removing the tire stock S so that the tire directly contacts the drum 50. The pressure at which the tire contacts the drum 50 can be regulated by regulating the height of arm 62 on vertical screw 65 in the manner shown in U.S. Pat. No. 2,863,507.

While the present invention has been described above with reference to a siping drum having two helical threads, it is to be understood that the invention includes siping drums having more than two helical threads wherein the butt ends of the helices on the two drum sections are sufficiently spaced apart peripherally to accommodate a knife when no spacer is employed or when the butt ends are not so spaced apart, one or more spacers are employed.

I claim:

1. An apparatus for siping a continuous web or a tire having a threaded feed drum, means for contacting said web or tire under pressure on the feed drum surface and means for rotating said feed drum to advance said tire or web along the major axis of the feed drum, the improvement wherein the peripheral surface of said drum has at least two parallel helical threads and means for attaching at least two knives to said drum, when more than one knife is attached to said drum each of said knives having a cutting edge extending above said drum peripheral surface and each of said knives being located on a different helical thread from the other knives.

2. The apparatus of claim 1 wherein said drum has two helical threads and two knives.

3. The apparatus of claim 1 wherein said drum is formed by joining two mating drum sections, the peripheral surface of each section having at least two parallel helical threads, said sections having a radial surface with exposed butt ends of each helix, said butt ends being spaced apart a peripheral distance to permit attaching a plurality of knives to the radial surface of a helix and to permit only one knife to be attached to the radial surface of each helix.

4. The apparatus of claim 3 wherein said drum sections have two parallel helical threads.

5. The apparatus of claim 1 wherein said drum is formed by joining two drum sections with a spacer thread therebetween, the surface of each section having two parallel threads, said sections having a radial surface with exposed butt ends of each helix, said butt ends being spaced apart a peripheral distance less than which permits attaching two knives between said butt ends, said spacer thread having the same circumference as said drum sections, the same thickness as one of said threads, and adapted to be attached to a butt end on each section so that when the spacer and two sections are joined, two continuous helical threads are formed and means for attaching one knife each to one radial surface of said spacer thread.

6. A feed drum for siping a continuous web or a tire having the peripheral surface with at least two parallel helical threads and means for attaching at least two knives to said drum, when more than one knife is attached to said drum, said knives having a cutting edge extending above said drum surface and each of said knives being located on a different helical thread from the other knives.

7. The apparatus of claim 6 wherein said drum has two helical threads and two knives.

8. The drum of claim 6 which is formed by joining two mating drum sections, the peripheral surface of each section having at least two parallel helical threads, said sections having a radial surface with exposed butt ends of each helix, said butt ends being spaced apart a peripheral distance to permit attaching a plurality of knives to the radial surface of a helix and to permit only one knife to be attached to the radial surface of each helix.

9. The drum of claim 8 wherein said drum sections have two parallel helical threads.

10. The drum of claim 6 wherein said drum is formed by joining two drum sections with a spacer thread therebetween, the surface of each section having two parallel threads, said sections having a radial surface with exposed butt ends of each helix, said butt ends being spaced apart a peripheral distance so that only one knife is attached to the radial surface of each helix, said spacer thread having the same circumference as said drum sections, the same thickness as one of said threads, and adapted to be attached to a butt end on each section so that when the spacer and two sections are joined, two continuous helical threads are formed and means for attaching one knife each to one radial surface of said spacer thread.

* * * * *

UNITED STATES PATENT OFFICE
CERTIFICATE OF CORRECTION

Patent No. 3,820,580                    Dated  June 28, 1974

Inventor(s) Forrest Clayton Meserve and Ralph Christian Raabe, Jr.

It is certified that error appears in the above-identified patent and that said Letters Patent are hereby corrected as shown below:

In column 1, line 68, change "periphery" to --peripheral--.

In column 2, line 42, change "periphery" to --peripheral--.

In column 3, line 49, change "bit" to --bite--.

In column 3, line 60, change "bit" to --bite--.

Signed and sealed this 15th day of October 1974.

(SEAL)
Attest:

McCOY M. GIBSON JR.                C. MARSHALL DANN
Attesting Officer                  Commissioner of Patents